May 13, 1947.  A. BURROWS  2,420,353
INSPECTION HOLE COVER FOR MOTOR VEHICLE BRAKE CASINGS
Filed Feb. 15, 1944
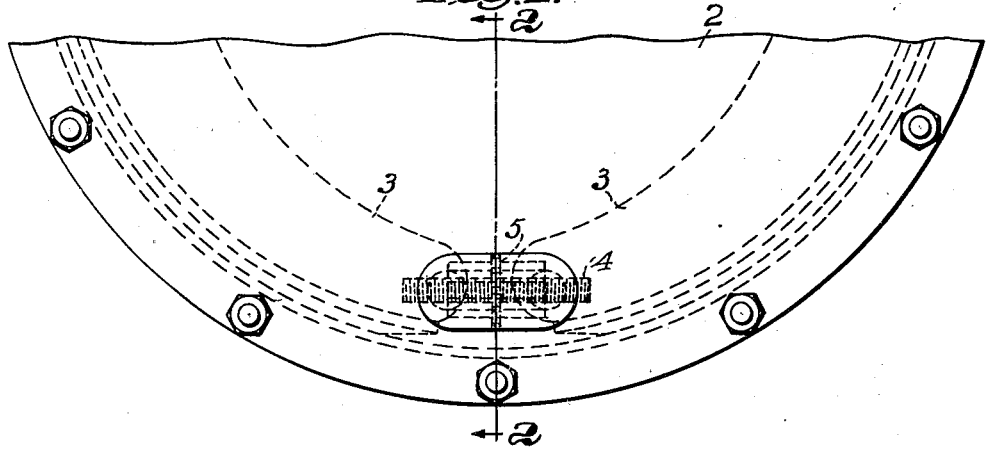
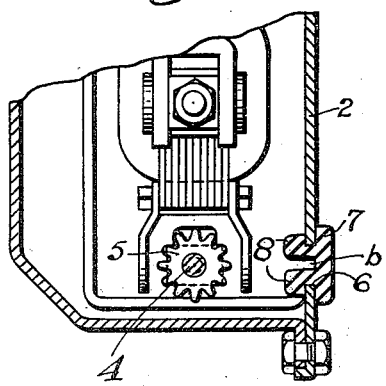 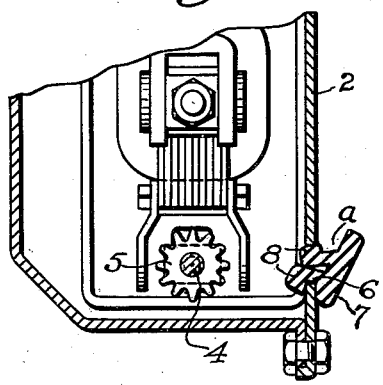
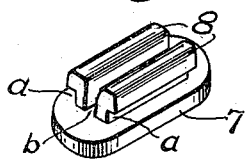
Inventor:
Allen Burrows,
by J. F. McCready,
Attorney.

Patented May 13, 1947

2,420,353

UNITED STATES PATENT OFFICE 2,420,353

INSPECTION HOLE COVER FOR MOTOR VEHICLE BRAKE CASINGS

Allen Burrows, Providence, R. I.

Application February 15, 1944, Serial No. 522,454

1 Claim. (Cl. 220—24)

This invention relates to the brake mechanisms for motor vehicles, and is more especially concerned with the enclosure for the brake mechanism. The brake drum and the brake shoes cooperating therewith are customarily enclosed in a casing provided with an aperture through which access may be had to the brake adjusting nut or other device. In some constructions the casing also is provided with one or more additional holes to facilitate inspection or the use of thickness gauges between the brake lining and the brake drum. All such holes will be referred to hereinafter as "inspection holes" or "apertures."

Unless these holes are closed water, dirt and grit will find their way through them into the brake mechanism and it is very liable to create serious trouble. While covers are customarily provided for these holes in order to prevent this difficulty, all of them, so far as I have been able to learn, are of such a nature that they are difficult to replace after having been once removed. The result is that the repair men frequently become impatient with them and throw them away.

This invention aims to devise a cover or plug for these inspection apertures which will effectively close them against the entrance of water and grit, and which, in addition, can be very easily removed and replaced.

The nature of the invention will be readily understood from the following description when read in connection with the accompanying drawings, and the novel features will be particularly pointed out in the appended claim.

In the drawings,

Fig. 1 is a front elevation of the lower portion of a brake casing showing a plug embodying this invention closing an aperture in said casing;

Fig. 2 is a vertical, sectional view on the line 2—2, Fig. 1, illustrating the plug in its operative position;

Fig. 3 is a view similar to Fig. 2 showing the plug in the process of being inserted in the aperture; and Fig. 4 is a perspective view of the plug.

In the construction shown in the drawings a brake casing is illustrated at 2 and the end portions of two brake arms are indicated at 3. These arms are connected by a screw 4 having right and left threads screwed into parts carried by the ends of the respective arms 3—3, and a toothed adjusting wheel 5 is secured fast to the middle portion of this screw so that by turning this wheel the ends of the arms 3—3 may be drawn toward, or forced away from, each other. In order to afford access to this adjusting mechanism, the casing 2 is provided with a rectangular aperture 6 through which a screw-driver, or other tool, may be inserted and by means of which the wheel 5 can be rotated in either direction desired.

The present invention provides a closure for this aperture 6 which, as best shown in Fig. 4, comprises a plate-like cover section or body 7 having two ribbed flange-like lugs 8—8 extending rearwardly therefrom and integral therewith. This plug may be made of any of the rubbery plastics, whether of natural rubber, synthetic rubber, or other plastic compositions not commonly referred to as rubber but which, nevertheless, are of a rubbery nature and have ample resiliency for this purpose. Koroseal is one example. At the present time these plugs are made of molded and vulcanized rubber compositions composed chiefly of reclaimed rubber. The lugs 8—8 are grooved on their outer edges at their junction with the cover section 7 and as indicated at a—a, to fit around the opposite edges of the aperture 6. They are spaced apart by a slot or groove b so that each can be bent toward the other.

One of these devices may be inserted in the aperture 6 in the manner indicated in Fig. 3. That is, the plug is tipped into approximately the position there shown, and held somewhat distorted by the thumb and forefinger while the lower edge of the aperture is inserted in the lower groove a of the plug, and the plug then is swung inwardly in a counter-clockwise direction while the upper lug 8 is pressed inwardly through the hole. It then expands immediately into its operative position, as shown in Fig. 2, where it is securely held with the plate-like part 7 covering both the outer end of the aperture and also the marginal portion of the casing immediately surrounding said aperture. The plug is interlocked with the portions of the casing immediately surrounding the aperture when it is in its operative position.

In order to remove the plug it is merely necessary to press down on the upper edge of the part 7, at the same time pulling this edge out. This tips the upper lug 8 outwardly into about the position shown in Fig. 3 and, as the tipping action continues, the edge of the upper lug snaps out through the aperture. The plug then is free to be lifted out.

In this connection it should be noted, however, that the groove b performs an important function both in inserting and removing the plug, since it permits the relative squeezing of the two lugs together to that degree necessary to enable the upper flange either to pass in through the slot or outwardly through it, depending upon the direction in which it is being moved.

These articles can be manufactured very economically; they make a tight joint with the walls of the aperture; and, because they are resilient bodies, they can be taken out and replaced almost instantly and with a minimum of trouble.

While I have herein shown and described the preferred embodiment of my invention, it will be evident that the invention is not limited to embodiment in the precise form shown.

Having thus described my invention, what I desire to claim as new is:

A plug for closing the inspection aperture of a motor vehicle brake casing, comprising a nonmetallic resilient structure having a plate-like cover section of generally rectangular form with marginal portions adapted to overlie the margin of the casing defining said aperture, and a pair of elongated parallel lugs integral with said section and projecting from the back thereof at right angles to the cover section, each of said lugs being grooved throughout its length at its outer wall adjacent said plate section to define a laterally extending elongated marginal projection, said lugs being uniformly spaced throughout their entire length by a slot having parallel sides extending lengthwise between them, said slot being of such a width that the outer marginal portion of one parallel lug with its projection can be shifted within the area defined by the slot when the reduced portion of the lugs are angularly distorted transversely of said plate by pressure applied during insertion and removal from said opening.

ALLEN BURROWS.

REFERENCES CITED

The following references are of record in the file of this patent:

UNITED STATES PATENTS

| Number | Name | Date |
| --- | --- | --- |
| 2,224,296 | Hoffman | Dec. 10, 1940 |
| 2,166,629 | White | July 18, 1939 |
| 1,014,450 | Carlsson | Jan. 9, 1912 |
| 1,998,791 | Schanz | Apr. 23, 1935 |
| 2,031,730 | Parker et al. | Feb. 25, 1936 |
| 2,180,886 | Thomas | Nov. 21, 1939 |
| 358,959 | Bopp | Mar. 8, 1887 |
| 1,938,590 | Hoffman | Dec. 12, 1933 |
| 2,142,230 | Yancey | Jan. 3, 1939 |
| 1,753,631 | Walters | Apr. 8, 1930 |